June 15, 1943.  C. BEST  2,322,108

WEIGHING APPARATUS

Filed April 10, 1940  3 Sheets-Sheet 1

Inventor
Cyril Best
By Watson, Cole, Grindle & Watson
Attorneys

June 15, 1943.　　　C. BEST　　　2,322,108
WEIGHING APPARATUS
Filed April 10, 1940　　　3 Sheets-Sheet 2
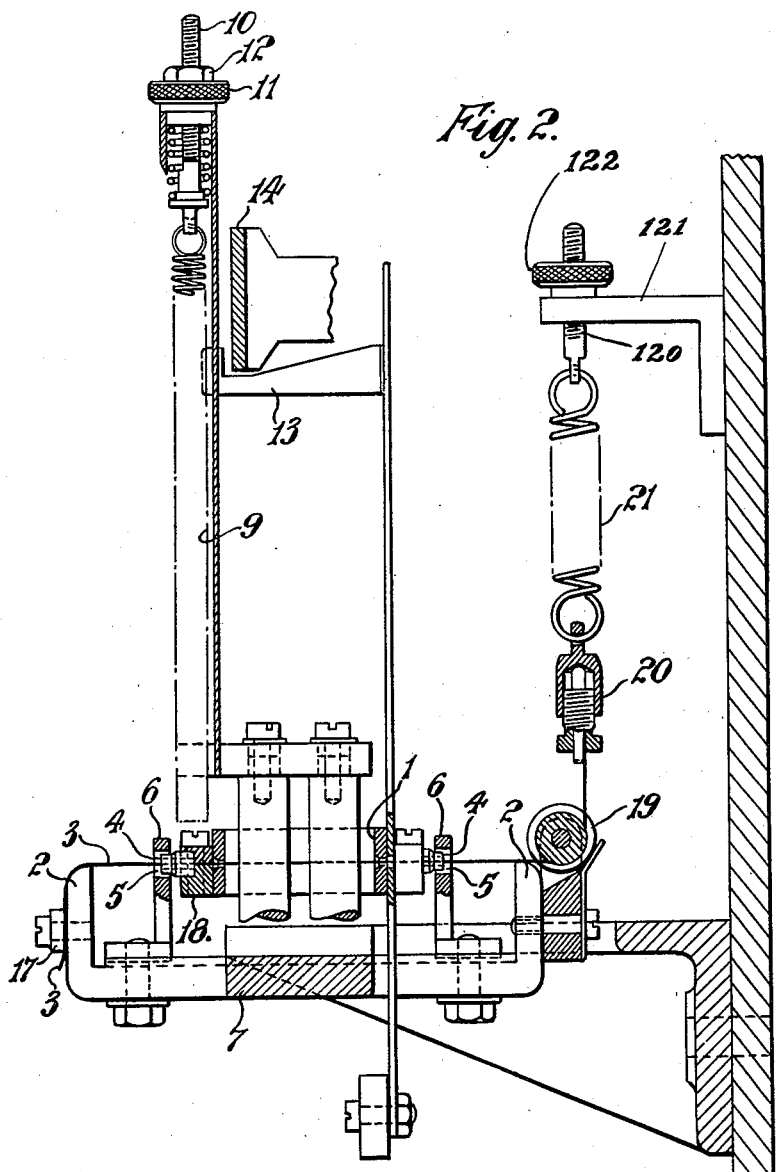
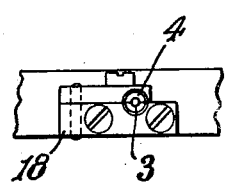

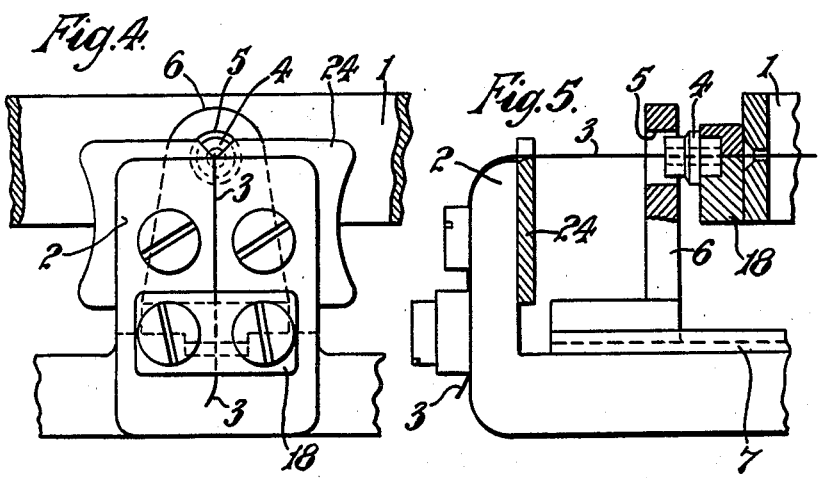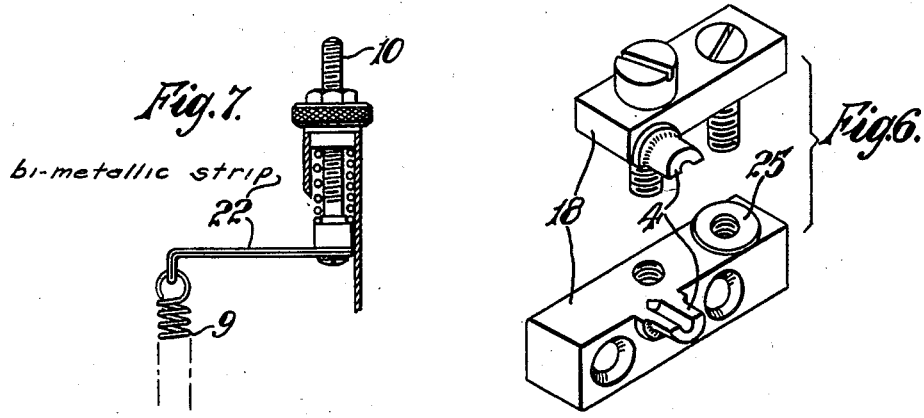

Patented June 15, 1943

2,322,108

UNITED STATES PATENT OFFICE 2,322,108

WEIGHING APPARATUS

Cyril Best, Deptford, London, England, assignor to Molins Machine Company, Limited, London, England Application April 10, 1940, Serial No. 328,947
In Great Britain April 21, 1939

7 Claims. (Cl. 308—2)

This invention is for improvements in and relating to weighing apparatus.

In weighing apparatus which is to be used to make a large number of weighings, it has been found difficult to find a method of supporting the weigh-beam which will be cheap and at the same time sufficiently strong to stand up to repeated weighings without showing wear and still be and remain sufficiently delicate. For example, in apparatus adapted to weigh relatively light articles such as, for instance, single cigarettes, the apparatus should remain sufficiently delicate to record differences of weight of the order of $\frac{1}{20}$ of a grain troy.

An object of the present invention is to provide a method of suspending the weigh beam which will comprise a substantially frictionless pivot, the efficiency of which will be unaffected by contact with dust.

According to the present invention there is provided a weighing apparatus wherein the weigh beam is carried by and clamped to a thread-like or strip-like element, for example, a wire, in tension. The tension may be applied by anchoring the element, which is usually arranged substantially horizontal, at one end and at the other end securing it to a relatively strong helical spring so that the parts are arranged in such a manner that tension is applied to the element through the helical spring. A knurled thumb screw may be provided for adjusting the tension to be given to the element.

In apparatus of the kind referred to for weighing light articles such as cigarettes, the weigh beam is of comparatively light construction and it is possible to suspend the weigh beam by means of an element such as a thin tension wire.

Although there is a slight deflection of the element between the lateral supports located on either side of the beam, it will be appreciated that this deflection need have no adverse effect on the accuracy of weighing. The weigh beam is provided with a pointer and a scale over which the pointer moves may be calibrated for any particular alteration of the weight in the scale pan.

The beam, of course, moves angularly with the element, as the centre of angular movement, and consequently the element is subjected to torsion. In the construction about to be described the invention is applied to an apparatus for checking the weight of single cigarettes. In such cases the apparatus is arranged to give a zero reading for cigarettes of correct weight and to show plus or minus variations from such weight where the cigarettes differ from the correct weight. Owing therefore to the fact that the angular movement is very small, probably rarely in excess of an angle of 5°, the construction can be readily arranged so that the elastic limit of the element is never reached. When it is desired to effect normal weighing operations involving a larger angular movement of the beam, a longer element may be used.

One way of carrying the invention into effect will be described with reference to the accompanying drawings, in which the beam supporting element consists of a wire.

In the drawings—

Figure 2 is a view taken in the direction of the arrow A, Figure 1, and partly in section.

Figure 3 is a detail of the wire clamp.

Figure 4 is a front elevation of a modified form of wire support, drawn to a larger scale.

Figure 5 is a side elevation of Figure 4, partly in section.

Figure 6 is an exploded view of an improved form of wire clamp.

Figure 7 shows a device for compensating for variation in temperature.

Like reference numerals refer to like parts throughout the specification and drawings.

Figure 1:
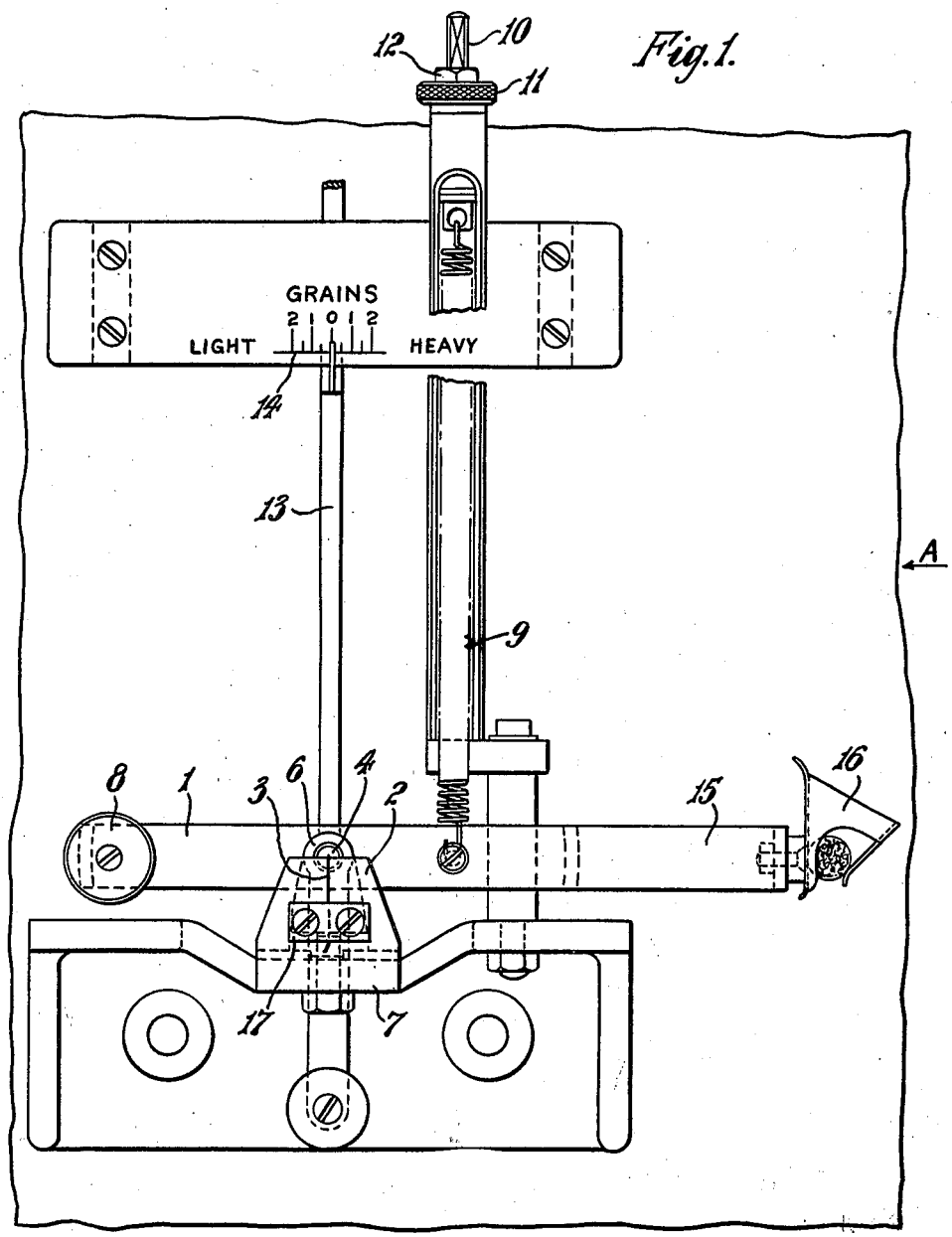
Figure 1 is a front elevation of part of a weighing apparatus embodying the invention.

Referring to Figures 1 and 2, the beam 1 lies between two lateral supports 2 which are provided with small "V" shaped notches, not visible in Figures 1 and 2, for locating a flexible element of small cross sectional dimensions shown as a wire 3. The beam is secured to the wire by being clamped as described below to that part of the wire which lies between the supports. The beam is also provided with cylindrical lugs or extensions 4 which extend laterally from the beam and which are concentric with the wire. Each of these projections extends into a circular hole 5 in a bracket 6 fixed to the base 7 of the member embodying the supports 2, and is freely movable in the hole, the latter being slightly larger than that diameter of the lug or extension which is normally located in the hole so that during weighing there is a clearance between the lug or extension and the hole. The main purpose of the lugs or extensions 4 and the holes 5 is to prevent any undue strain being put on the wire 3 should the beam 1 be knocked, for example, by the operator's hand.

The weigh beam in the construction illustrated is arranged as a balance, and heretofore it has been customary to provide a weight similar to the counterweight 8 at one end of the beam. In this way the beam is arranged to take up a neutral position when articles of a specified weight are to be weighed, and to swing to one side or the other of the neutral position according to whether an article being weighed is heavier than or lighter than the specified weight. The position taken up by the beam is arranged, by providing a suitably calibrated scale, to indicate the amount by which an article being weighed is greater or less than the specified weight. Thus when the beam is to be in the neutral position when the article weighed is of correct weight, it is necessary to load the beam differently to suit each specified weight, i. e., to change the weight similar to the counterweight 8.

In the present case, however, the beam is suitably loaded by adjustably anchoring a helical tension spring 9 to the weigh beam at one side of the centre of gravity. The tension of the spring is adjusted by a micrometer screw 10. By this means a very simple and quick means is provided for changing over from weighing articles of one specified weight to articles of another specified weight. All that is required is a simple adjustment of the micrometer screw 10 by the knurled nut 11 and lock-nut 12, thus altering the spring tension until the beam with a weight of desired magnitude in the scale pan rests in equilibrium in the position shown by the pointer 13 on the calibration scale 14 to be the neutral position.

The weigh beam 1 shown in the drawings comprises a rectangular frame, the apparatus in general being of the kind described in United States patent application No. 293,862, and an arm 15 carries a scale pan 16. This arm naturally makes the beam heavier on the right hand side of the centre of suspension and the counterweight 8 is provided to restore the balance. Preferably the weight is such as to balance the beam when a cigarette of a common weight (e. g., 24 per ounce) is in the pan. Then any trifling variations necessary to balance the beam for cigarettes of other nominal weights may be effected by slight adjustment of the spring 9.

The wire 3 is anchored at one end by clamping the wire beneath a plate 17 and the wire is fixed to the weigh beam by clamps 18 attached as shown in Figure 3. These clamps 18 also serve to hold the lugs or extensions 4 in place, the lugs or extensions being split on a diameter if necessary so that the plates of the clamp 18 can be brought sufficiently close together to grip the wire. The wire passes through holes in the beam which are countersunk as shown in Figure 2 to facilitate the passing of the wire through the holes. The other end of the wire passes round a V pulley 19 to a clamp or chuck 20 which is connected to one end of a relatively strong helical tension spring 21 which is included in the anchorage for the end of the wire. The other end of the spring 21 is connected with a screw 120 which is supported in a bracket 121. The tension in the spring 21 is adjusted by a knurled nut 122. By this method of applying tension to the wire it will be seen that a relatively coarse adjustment of the nut 122 will make a relatively fine adjustment of the tension in the wire. Without the interposition of the spring or any other yielding means the slightest movement of the nut 122 would be wholly reflected in the wire so that to obtain the desired tension in the wire would be exceedingly difficult.

The clamp 20 consists of a common taper pin supported in screwed bush. The bush is screwed into a sleeve and the pin abuts against the interior of the sleeve so that the screwing operation forces the taper pin into close engagement with the hole in the screwed bush. The wire 3 is held between the pin and the bush and thus a cheap and effective clamp is provided for the smallest wire, the wire used in the example shown being .006 of an inch in diameter.

The spring 9 may be arranged to compensate for temperature variations affecting said spring by the use of a thermo-sensitive device incorporated in the spring anchorage. This may comprise a bimetallic strip 22 interposed between the adjusting screw 10 and the spring 9 as shown in Figure 7.

The wire is made thin, so that any restoring effort on the part of the wire is small if not almost negligible in relation to the mass of the weighted beam.

In Figures 4 and 5 a modified construction is shown where plates 24 having V grooves in them are adjustably fitted on the supports 2. This arrangement permits a finer adjustment when assembling and setting up the apparatus. Preferably the surfaces of the sides of the V are formed at an acute angle with respect to the plane of the inner surface of the plate as shown in Figure 5 so that the wire is stretched over a knife edged V and cannot roll in the V during the operation of the machine. The cylindrical lugs or extension 4 are shouldered as shown in Figure 5 and the shoulder has a good bush fit in the hole 5. In assembling the device the brackets 6 are slid along the base 7, which is slotted to permit movement of the clamping screws, until the shoulders of the lugs or extension fit in the holes 5. The wire is threaded through the holes in the beam and clamped and made taut. Then the brackets 6 are moved back to the position shown in Figure 5 and fixed in position and a final tightening of the wire is made by the adjustment of the anchorage of the spring 21. In this way proper alignment of the parts is secured.

The clamp 18 shown in Figure 6 incorporates the lug or extensions 4, half of such lug or extension being integral with a part of the clamp. A thin washer 25 is placed between the parts of the clamp, its thickness being substantially equal to the diameter of the wire 3. The wire is gripped between flat faces of the clamp, while the lug or extension 4 is drilled to clear the wire.

What I claim as my invention and desire to secure by Letters Patent is:

1. In weighing apparatus, a member mounted for swinging movement, a tensioned flexible element of small cross-sectional dimensions to which said member is secured and which acts as the support for said member, extensions on said member, which extensions surround the flexible element, and guides into which said extensions extend and in which they are freely movable to prevent undue accidental strain on said flexible element.

2. In weighing apparatus, a member mounted for swinging movement, a tensioned flexible element of small cross-sectional dimensions to which said member is secured and which acts as the support for said member, extensions on said member, which extensions surround the flexible element, guides into which said extensions extend and in which they are freely movable to prevent undue accidental strain on said flexible element, and a support for said flexible element, said support having V locating notches formed therein.

3. In weighing apparatus, a member mounted for swinging movement, a tensioned, flexible element of small cross-sectional dimensions to which said member is secured and which acts as the support for said member, extensions on said member, which extensions surround the flexible element, adjustable guides into which said extensions extend and in which they are freely movable to prevent undue accidental strain on said flexible element, and external shoulders on said extensions to cooperate with said guides during the assembly of the apparatus to facilitate the initial aligning and tensioning of the flexible element.

4. In weighing apparatus, a member mounted for swinging movement, a flexible element of small cross-sectional dimensions anchored so as to be under tension and to which said member is secured and which acts as the support for said member, and resilient means included in the anchorage of said element and adapted to yield on the application of tension to said element.

5. In weighing apparatus, a member mounted for swinging movement, a flexible element of small cross-sectional dimensions anchored so as to be under tension and to which said member is secured and which acts as the support for said member, resilient means included in the anchorage of said element and adapted to yield on the application of tension to said element, extensions on said member, which extensions surround the flexible element, and guides into which said extensions extend and in which they are freely movable to prevent undue accidental strain on said flexible element.

6. In weighing apparatus, a member mounted for swinging movement, a flexible element of small cross-sectional dimensions anchored so as to be under tension and to which said member is secured and which acts as the support for said member, resilient means included in the anchorage of said element and adapted to yield on the application of tension to said element, extensions on said member, which extensions surround the flexible element, guides into which said extensions extend and in which they are freely movable to prevent undue accidental strain on said flexible element, and a support for said flexible element, said support having V locating notches formed therein.

7. In weighing apparatus, a member mounted for swinging movement, a flexible element of small cross-sectional dimensions anchored so as to be under tension and to which said member is secured and which acts as the support for said member, resilient means included in the anchorage of said element and adapted to yield on the application of tension to said element, extensions on said member, which extensions surround the flexible element, guides into which said extensions extend and in which they are freely movable to prevent undue accidental strain on said flexible element, and a support for said flexible element, said support having V locating notches formed therein.

CYRIL BEST.